(12) United States Patent
Chandler et al.

(10) Patent No.: US 7,589,140 B2
(45) Date of Patent: Sep. 15, 2009

(54) FLUOROPOLYMER BONDING COMPOSITIONS

(75) Inventors: Blake Eldon Chandler, Woodbury, MN (US); Naiyong Jing, Woodbury, MN (US)

(73) Assignee: 3M Innovative Properties Company, St. Paul, MN (US)

(*) Notice: Subject to any disclaimer, the term of this patent is extended or adjusted under 35 U.S.C. 154(b) by 489 days.

(21) Appl. No.: 11/239,585

(22) Filed: Sep. 29, 2005

(65) Prior Publication Data

US 2007/0072975 A1    Mar. 29, 2007

(51) Int. Cl.
*C09D 5/08* (2006.01)

(52) U.S. Cl. .................. 524/407; 524/423; 524/500; 524/544; 525/337

(58) Field of Classification Search ............. 524/407, 524/500, 544, 423; 525/337
See application file for complete search history.

(56) References Cited

U.S. PATENT DOCUMENTS

| | | | |
|---|---|---|---|
| 4,954,412 A * | 9/1990 | Breton et al. | 430/137.12 |
| 5,397,831 A | 3/1995 | Saito et al. | |
| 5,733,981 A * | 3/1998 | Coggio et al. | 525/326.2 |
| 5,760,151 A | 6/1998 | Aten et al. | |
| 5,981,673 A | 11/1999 | DeSimone et al. | |
| 6,124,386 A | 9/2000 | Yokota et al. | |
| 6,869,682 B2 * | 3/2005 | Jing | 428/421 |
| 6,986,947 B2 * | 1/2006 | Jing et al. | 428/422 |
| 7,273,531 B2 * | 9/2007 | Jing et al. | 156/272.2 |
| 2004/0138367 A1 | 7/2004 | Lahijani | |
| 2005/0080210 A1 | 4/2005 | Jing et al. | |
| 2005/0080212 A1 | 4/2005 | Jing et al. | |
| 2005/0154145 A1 | 7/2005 | Kolb et al. | |
| 2005/0159558 A1 | 7/2005 | Govaerts et al. | |
| 2007/0049706 A1 * | 3/2007 | Siripurapu et al. | 525/464 |

FOREIGN PATENT DOCUMENTS

| | | |
|---|---|---|
| AU | 07616635 | 8/1976 |
| EP | 0 226 668 BA | 1/1992 |
| EP | 1 031 384 A2 | 8/2000 |
| EP | 1 188 808 A1 | 3/2002 |
| EP | 1 170 303 | 7/2007 |
| JP | 2904593 B2 | 9/1992 |
| JP | 10-025447 | 1/1998 |
| WO | WO-2007/041421 A1 * | 4/2007 |

OTHER PUBLICATIONS

Pianca et al., "End groups in fluoropolymers," Journal of Fluorine Chemistry 95 (1999) 71-84.

* cited by examiner

*Primary Examiner*—Peter D. Mulcahy
*Assistant Examiner*—Henry Hu
(74) *Attorney, Agent, or Firm*—Brian E. Szymanski; Julie A. Lapos-Kuchar

(57) ABSTRACT

Provided are fluoropolymer blends comprising a fluoropolymer having a major amount of fluorothermoplastic, a bubble suppressing metal compound, a base and a phase transfer catalyst. Also provided are layered articles comprising a first layer having the described fluoropolymer blend and methods for making the layered articles.

12 Claims, No Drawings

FLUOROPOLYMER BONDING COMPOSITIONS

BACKGROUND

Fluoropolymers have unique properties such as low surface energy, high use temperature, and near universal chemical resistance. These properties, beneficial in many contexts, each play a part in making it difficult to bond fluoropolymers (especially perfluorinated fluoropolymers) to substrates made of other materials. The most practiced methods of bonding fluoropolymers to other materials include blending a fluoropolymer with a functionalized hydrocarbon polymer, such as, for instance, a polyamideimide, polysulfone or polyethersulfone, where the functionalized hydrocarbon polymer bonds to the material of the substrate, allowing formation of an interpenetrating network with the functionalized hydrocarbon polymer and the fluoropolymer. The functionalized hydrocarbon materials used to enhance bonding, however, may have several undesirable effects on the fluoropolymer composition. The functionalized hydrocarbon binder generally has less chemical resistance, lower thermal stability, lower dielectric properties, and higher surface energy than the fluoropolymer with which it is blended. These effects limit the applications to which fluoropolymer blends may be put. Lower thermal stability may serve to limit end use applications of the blends and also may lead to off-gassing during topcoat fusing processes. This off-gassing may cause micro or macro blemishes in the topcoat. The lower dielectric properties and higher surface energy of functionalized hydrocarbon binders may also further limit the applications in which a blend may be used. Furthermore, the bonds formed between a blended fluoropolymer-functionalized hydrocarbon polymer layer and a substrate are generally weakened in high temperature environments, particularly where moisture is present.

SUMMARY

Certain embodiments of the present invention provide high strength bonding between fluoropolymers and substrates that may overcome some or all of the negative aspects of interpenetrating network systems. Many of the compositions described in the present application exhibit excellent heat stability with no apparent off-gassing. Furthermore, while boiling a multilayer article in water for one or more hours prior to peel testing can cause a significant loss in peel strength in the hydrolytically unstable interpenetrating network systems, some of the compositions described herein maintain good bonds even after boiling a multi-layer article in water.

In one aspect, the present invention relates to a fluoropolymer blend comprising a fluoropolymer, a bubble suppressing metal compound, a base and a phase transfer catalyst.

Many of the fluoropolymer blends of the present invention are well suited for forming layered articles. Layered articles may comprise a substrate comprising a substantially inorganic material and a first layer comprising a fluoropolymer, a bubble suppressing metal compound, a base and a phase transfer catalyst.

In yet another aspect, the present invention also relates to a method of bonding a fluoropolymer blend to a substrate. The method may comprise providing a substrate and contacting the substrate with a fluoropolymer blend comprising a fluoropolymer, a bubble suppressing metal compound, a base and a phase transfer catalyst. The fluoropolymer blend forms a first layer. The method may further comprise bonding the first layer to the substrate.

It is an advantage of some embodiments of the present invention in one aspect to provide fluoropolymer blends for bonding fluoropolymers to substantially inorganic substrates such as metals. Other features and advantages of the invention will be apparent from the following detailed description of the invention and the claims. The above summary is not intended to describe each illustrated embodiment or every implementation of the present invention. The description that follows more particularly describes and exemplifies certain preferred embodiments using the principles disclosed herein.

DETAILED DESCRIPTION

In one respect, the present invention provides a fluoropolymer blend comprising a fluoropolymer, a bubble suppressing metal compound, a base and a phase transfer catalyst.

Suitable fluoropolymers for the present invention include fluorothermoplastics such as those having interpolymerized units of one or more fluorinated or perfluorinated monomers such as tetrafluoroethylene, chlorotrifluoroethylene, hexafluoropropylene, vinylidene fluoride, vinyl fluoride, fluorovinylethers, perfluorovinylethers, perfluoro-(2,2-dimethyl-1,3-dioxole), as well as combinations of one or more of these along with one or more non-fluorinated comonomer(s) such as ethylene or propylene or lower olefins (i.e., a-olefins having 3 to 12 carbon atoms). In another aspect, high molecular weight polytetrafluoroethylene (PTFE) can be used in a blend with a fluorothermoplastic. Alternatively, low molecular weight PTFE, including micropowders, may be used, preferably in a blend with another fluoropolymer, and optionally as a fluoropolymer filler. By "high molecular weight" PTFE is meant a PTFE having a melt flow index of below 1. By "low molecular weight" PTFE is meant a PTFE having a melt flow index of 1 or above. More specifically, useful fluoropolymers include those commercially available under the designations THV (described as a copolymer of tetrafluoroethylene, hexafluoropropylene, and vinylidene fluoride), FEP (a copolymer of tetrafluoroethylene and hexafluoropropylene), PFA or TFM (both including tetrafluoroethylene and perfluorovinylether, PFA being classified as a copolymer, TFM being classified as a homopolymer under ISO 12086), HTE (a copolymer of tetrafluoroethylene, hexafluoropropylene, and ethylene), ETFE (a copolymer of tetrafluoroethylene, ethylene, and optionally containing further modifiers), ECTFE (a copolymer of chlorotrifluoroethylene and ethylene), PVF (polyvinylfluoride), PVDF (polyvinylidene fluoride), TEFLON® AF (a copolymer of tetrafluoroethylene and perfluoro-(2,2-dimethyl-1,3-dioxole); available from E.I. du Pont de Nemours and Company, Wilmington, Del.), MFA (a copolymer of tetrafluoroethlyene, methyl vinyl ether, and optionally a perfluoro(propyl vinyl) ether), EFEP (a copolymer of ethylene, hexafluoropropylene, and tetrafluoroethylene), PCTFE (a polymer including chlorotrifluoroethylene), CYTOP™ (prepared by cyclopolymerization of selected perfluorodienes; available from Asahi Glass Company, Tokyo, Japan) as well as combinations and blends thereof. Any of these materials may further contain interpolymerized units of additional monomers, e.g., tetrafluoroethylene, hexafluoropropylene, vinylidene fluoride, ethylene, or a perfluorovinylether such as perfluoroalkylvinylether and/or a perfluoroalkoxyvinylether. Combinations of two or more fluoropolymers may also be used. In some embodiments, fluorothermoplastics such as THV and/or ETFE and/or HTE are preferred.

In another aspect, a fluorothermoplastic may be a copolymer derived from copolymerizable units comprising a perfluorinated alkyl olefin of the formula $CF_2\!=\!CFR$, wherein R is F or a linear, branched, or cyclic alkyl group of 1 to 10 carbon atoms; a perfluoro(alkyl vinyl) ether; a perfluoro(alkoxy vinyl) ether; or a combination thereof. The fluorothermoplastic may also be a homo- or copolymer derived from polymerizable units of a perfluorinated alkyl olefin of the formula $CF_2\!=\!CFR$ wherein R is F or a linear, branched, or cyclic perfluorinated alkyl group of 1 to 10 carbon atoms.

In some embodiments, where a perfluoro(alkyl vinyl) ether is included in the fluorothermoplastic, it may be selected from those monomers having the general formula $CF_2\!=\!CFOR^1$, wherein $R^1$ is a linear, branched, or cyclic perfluorinated alkyl group of 1 to 10 carbon atoms. Preferred embodiments include perfluoro(methyl vinyl) ether, perfluoro(ethyl vinyl) ether, and perfluoro(propyl vinyl) ether. Where a perfluoro(alkoxy vinyl) ether is included in the fluorothermoplastic, it may be selected from those monomers having the general formula $X\!-\!(O\!-\!Y)_a\!-\!O\!-\!CF\!=\!CF_2$ wherein a may be an integer from 1 to 10; X may be selected from the group consisting of $C_nF_{2n+1}$ wherein n is 1 to 10; and Y may be selected from the group consisting of $C_pF_{2p}$ wherein p is 1 to 10, and $CF(CF_3)CF_2$.

In another embodiment, a fluorothermoplastic may contain less than 50 endgroups per million carbon atoms, less than 20 endgroups per million carbon atoms, or the fluoropolymers may be essentially free of endgroups. In this context, "essentially free" means less than 10 endgroups per million carbon atoms. By "endgroups" is meant reactively unstable moieties at the end of a polymer chain, such as, for example, $-CF_2CH_2OH$, $-CONH_2$, $-C(O)OH$, $-CF_2H$, $-CF\!=\!CF_2$, or $-COF$. While it is generally found that fluoropolymer blends containing a fluorothermoplastic with more than 50 endgroups per million carbon atoms adhere greater than fluoropolymer blends containing a fluorothermoplastic with less than 50 endgroups per million carbon atoms, certain uses for the fluoropolymer blends may in fact favor using a fluorothermoplastic with less than 50 endgroups per million carbon atoms. When greater adhesion is desired, however, it is useful to employ a fluorothermoplastic with more than 50 endgroups per million carbon atoms.

The number of endgroups present may be reduced by fluorination of the fluorothermoplastic polymer. Fluorination may be carried out with a variety of fluorine radical generating compounds, but preferably the polymer is contacted with fluorine gas. Such gas is usually diluted with an inert gas such as nitrogen, due to the exothernicity of the reactions with fluorine. Typically, the level of fluorine in the fluorine/inert gas mixture may be in the range of 1 to 100 volume %, but is preferably 10 to 25 volume %. The temperature may be between 150° C. and 250° C. The fluorination time may be between 1 to 20 hours, preferably 8 to 12 hours. For complete fluorination, one may maximize the surface area of the polymer exposed to the fluorine gas mixture, for example, by agitating the polymer. Gas pressure may range from 1 to about 10 atmospheres but preferably ambient pressure is used. The endgroups are generally converted to $-CF_3$ groups. After exposure to the fluorination conditions, the polymer may be subjected to a flow of inert gas, such as nitrogen.

In another aspect, the fluoropolymers may comprise "active groups". By "active groups" it is meant groups provided either as an endgroup or in the backbone of the polymer (e.g., sidechain groups; cure sites provided, for instance, by polymerizing in the presence of a halogen-transferring material or copolymerizing with a so-called cure site monomer; or "modified" polymers containing units derived from comonomers having active groups) that are capable of increasing the bonding strength of the fluoropolymer to a substrate. Active groups may also be generated in-situ, for instance, by treating "pre-active groups" to provide active groups. Such treatment may include, for instance, heating, exposing to pressure, radiation, or chemical treatment. In one embodiment, pre-active groups may be present in post-fluorinated fluoropolymers, for instance, $-CF_2CF_2H$ may be converted into a more reactive group.

In some embodiments, the fluoropolymer blends may have a major amount of fluorothermoplastic. By "major amount" is meant that when more than one fluoropolymer is present, the largest fluoropolymer component by weight is a fluorothermoplastic. In other embodiments, when more than one fluoropolymer is present, the fluorothermoplastic comprises 50% or more by weight of the fluoropolymer component. Of course, included in the term "major amount fluorothermoplastic" is also a fluoropolymer component that is 100% by weight fluorothermoplastic.

In addition, a phase transfer catalyst may be used in the present fluoropolymer blends. Such materials are known in the art and include, for example, salts of triphenylbenzylphosphonium, tetraphenylphosphonium, triarylalkylphosphonium, tetrabutylphosphonium, tributylbenzylammonium, tetrabutylammonium, triarylsulfonium, diphenyliodonium or combinations thereof. The salts may include, for example, halogen salts, such as bromide or chloride salts, hydroxyl, or alkoxy salts. In other embodiments, phase transfer catalysts may also include crown ether-like phase transfer catalysts.

The phase transfer catalyst is generally used in small amounts relative to the total weight of the fluoropolymer blend. For example, the amount of phase transfer catalyst is generally below 20 weight percent, below about 10 weight percent, below about 5 weight percent, or even below 3 weight percent of the overall fluoropolymer blend (i.e., base, fluorothermoplastic, bubble suppressing metal compound, and phase transfer catalyst, but not including a substrate when used). In another aspect, the phase transfer catalyst is generally above about 0.1 weight percent, above 0.3 weight percent, above 0.5 or even above about 2.0 weight percent of the overall fluoropolymer blend.

Other additives may also be included in the present fluoropolymer blends. These other additives may include but are not limited to inert fillers, stabilizers, pigments, reinforcing agents, lubricants, flow additives, other polymers, and the like. Flow additives may include waxes such as, for example, carnauba (vegetable wax), paraffin (mineral wax), and lipid-type waxes (such as esters of ethylene glycol).

The present fluoropolymer blends may also include a bubble suppressing metal compound. By "metal compound" is meant metals, metal oxides, metal salts, metal hydrates, mixtures, and alloys thereof. Such metal compounds include, but are not limited to, Sn, SnO, Active Al, $SnSO_4$, Fe, Zn, $MgAl_2(SO_4)_2$, Cr, $Cr_2O_3$ and combinations thereof. The metal compounds may be in the form of a metal powder, typically having a particle size of no greater than about 100 μm, no greater than 50 μm, no greater than 10 μm, or even no greater than 5 μm. The metal compound can be added to the post-fluorinated or non-post fluorinated fluoropolymer. If the fluoropolymer is post fluorinated, the metal compound is added after fluorination treatment, so that the fluorine does not react with the metal compound. In some embodiments, the metal compound may be present in an amount less than about 20 percent by weight based on the total weight of the fluoropolymer blend, less than about 10 percent by weight, less than about 5 percent by weight, or even less than about 2 percent by weight.

In a further aspect, the present fluoropolymer blend may include a base. Useful bases include those that are capable of neutralizing a fluorinated carboxylic acid endgroup. Appropriate bases are not particularly limited, and include, for example, Group I hydroxides and oxides, Group II hydroxides and oxides, organic bases such as, for instance, amine-derived bases or alkoxide bases (including metal salts), and combinations thereof. In other embodiments, the base may include, for instance, transition metal hydroxides. The base may be added in an amount less than 2 percent by weight based on the total weight of the fluoropolymer blend, less than 5 percent, or less than about 10 percent.

The fluoropolymer blend may be in the form of a slurry comprising the fluoropolymer blend as described above and a solvent. The solvent may be a fluorinated solvent, which may be perfluorinated, perhalogenated, partially fluorinated, partially halogenated, non-fluorinated, or non-halogenated, including water. The solvent may either be capable of solubilizing the fluoropolymer or may provide a medium in which to form a dispersion or suspension when the slurry contains a surfactant. The slurry may further comprise a surfactant. Optionally, the surfactant may be a fluorinated surfactant, which may be perfluorinated or partially fluorinated. The surfactant may also be non-fluorinated. The surfactant may be ionic (anionic or cationic), or non-ionic. The fluoropolymer blend may also be in the form of a dispersion.

In another aspect, the present invention provides a layered article. In particular embodiments, a layered article may comprise a substrate of substantially inorganic material. Layered articles may also comprise a first layer of a fluoropolymer blend as described above, comprising a fluorothermoplastic, a bubble suppressing metal compound, a base and a phase transfer catalyst.

Without intending to be bound by theory, it is believed that the presence of the metal compound in the fluoropolymer blend enables the fluoropolymer blend to form a layer, in some embodiments a smooth bubble-free layer, onto a substrate, whether or not the fluoropolymer is post-fluorinated. By smooth, it is meant that craters, voids, lumps and/or bubbles are not present in or at the surface of the fluoropolymer blend. Lumps are encapsulated bubbles that protrude from the exposed surface of the fluoropolymer blend. The absence of voids or bubbles indicates that the fluoropolymer blend forms a continuous layer on the contacted surface of a substrate. By bubble-free it is meant that bubbles are not visible to the naked eye in the layer and the residue of bubbles, voids or craters are not visible either.

Suitable substrates for layered articles include organic or inorganic materials. Particularly useful are substantially inorganic materials. Substantially inorganic materials include, for instance, glass, ceramic, metal, iron, steel, stainless steel, aluminum, copper, nickel, and alloys and combinations thereof. More specific examples of substrates include metallic sheet in the form of ductwork such as is useful in exhaust ducts for chemical or semiconductor operations.

By "bubble suppressing" is meant that a fluoropolymer blend as described herein containing a metal compound displays less bubbling than a similar fluoropolymer blend that differs in that it does not contain a metal compound. This may be measured, for instance, as a bubble index. A larger value of bubble index indicates a higher amount of bubble formation. Thus, to be bubble suppressing, a fluoropolymer blend as described herein containing a metal compound gives a lower bubble index than a similar fluoropolymer blend that differs in that it does not contain a metal compound. In some embodiments, a fluoropolymer blend as described herein may have a bubble index which is 5%, 10%, 25%, 50%, 75%, or even greater than 90% lower relative to the bubble index of a comparative fluoropolymer blend that differs in that the comparative fluoropolymer blend does not contain a metal compound.

Measuring a bubble index entails, for instance, placing a 15 gram sample of the fluoropolymer blend into a new clean aluminum pan which is about 50 mm in diameter, 16 mm deep and 0.8 mm thick. The sample is baked at a temperature that is 30% above the $T_m$ for the fluoropolymer (as measured in ° C.) for 90 minutes in a recirculating air oven. The baking time is defined as fluoropolymer blend exposure time between closing and opening the oven door. The oven air temperature is preset and recovers to the set temperature within 5 to 10 minutes after sample addition. The degree of bubble formation is observable qualitatively and is measured by the percentage increase in specific volume of the fluoropolymer blend relative to the pre-baked fluoropolymer blend. The bubble index may be defined as:

$$\text{Bubble Index} = [(\rho_S/\rho_B) - 1] * 100$$

where:
$\rho_S$=specific gravity of the pre-baked fluoropolymer blend
$\rho_B$=specific gravity of the baked fluoropolymer blend and where:

$$\rho_S = [W_{AS}/(W_{AS} - W_{WS})] \times D$$

where
$W_{AS}$=Mass of the pre-baked fluoropolymer blend in air
$W_{WS}$=Mass of the pre-baked fluoropolymer blend in a fluid
D=Density of the fluid and where $$\rho_B = [W_{AB}/(W_{AB} - W_{WB})] \times D$$

where
$W_{AB}$=Mass of the pre-baked fluoropolymer blend in air
$W_{WB}$=Mass of the pre-baked fluoropolymer blend in a fluid
D=Density of the fluid Substrates may be provided as the surface of a continuous sheet, a flake, fiber, particle, or some combination thereof. For example, a substrate may be a metal surface of bakeware or cookware. Alternatively, a substrate may be the surface of a fiber, flake, or particle, wherein the layered article is provided dispersed in or at the surface of the above-described fluoropolymer blend.

In one respect, the presence of a fluoropolymer, a base, a phase transfer catalyst and a bubble suppressing metal compound in the fluoropolymer blend allows for the formation of a first layer on a substrate to be used as a single layer coating. The use of a small amount of bubble suppressing metal compound allows coating as a single layer without concern that the metal compound will contaminate any material exposed to the first layer, for instance, where the first layer is a roto-lining layer coating the interior surface of a hollow article. The metal compound does not migrate to the surface of the layer. Instead, the metal compound is dispersed in the layer formed.

A second layer that is free of metal compound may be applied adjacent to the first layer. This may be particularly useful in applications where extreme purity is required for a material contacting the layered article. The second layer may comprise a fluoropolymer. The fluoropolymer of the second layer may be post-fluorinated to provide less than 50 endgroups per million carbon atoms, as described above. Post-fluorination may be preferred when the layered article is to provide an inert surface that may come into contact with reactive materials.

In certain embodiments, the fluoropolymer blends of the present application undergo very little discoloring of the fluoropolymer, making possible clear coats over a substrate, for instance, a clear coat over a metal substrate. Also possible are a wide range of colored coatings, including white, with the addition of appropriate fillers and pigments. Additionally, because some embodiments only require low levels of additives, articles with only a first layer may possibly maintain most of the beneficial properties of the fluoropolymer itself.

Further embodiments of the present invention may include a second layer adjacent to the first layer, wherein the second layer comprises a fluoropolymer. The fluoropolymer of the second layer may be perfluorinated or partially fluorinated. The fluoropolymer of the second layer may also comprise a blend of a fluoropolymer with a second polymer. The second polymer may be perfluorinated, partially fluorinated, or non-fluorinated. Particularly useful are fluoropolymers and fluoropolymer blends containing at least one perfluorinated fluoropolymer. In addition, a binder layer may be present between the first and second layer, or a binder material may be incorporated into the second layer. By binder material it is meant a material that promotes bonding between the first and second layer.

The layered articles of the present invention may also optionally comprise a third layer adjacent to the second layer. This third layer may also optionally comprise a fluoropolymer. In the embodiments having multiple layers (in addition to the substrate), the first layer preferably adheres very well to the substrate while the subsequent layers each adhere well to each immediately adjacent layer. Subsequent layers may include, for example, fluoropolymers, such as fluorothermoplastic homopolymers, fluorothermoplastic copolymers, fluoroelastomers, perfluoroelastomers, polytetrafluoroethylene, modified polytetrafluoroethylene, or combinations or blends thereof. When an elastomer is selected, a suitable curative may be used in the layer having the elastomer.

The first layer preferably provides a continuous coating on the substrate, although in some aspects, the first layer and any subsequent layer(s) independently may be continuous or discontinuous.

The embodiments of layered articles described herein may provide acceptable bonding, as measured via peel strength testing described below, under various exposure conditions. For example, at room temperature (around 22 to 25° C.), the layered articles described herein may provide a bond between a first layer and various substrates. In addition, the layered articles may maintain desirable peel strength after various exposure conditions of increasing severity and duration such as boiling water exposure. For instance, in several embodiments, the layered articles provide high or very high peel strength between the first layer and the substrate even after boiling water exposure. The desired peel strength depends upon the application. For example, room temperature bonding may be sufficient for many uses. In other applications, maintaining peel strength after exposure to boiling water for a duration of one or even several hours may be desired. In some embodiments, the layered articles provide peel strengths in pounds per inch of at least about 4, 5, 10, 15, 20, 25, or even higher. These levels in Newtons per millimeter (N/mm) range from about 0.7, 0.9, 1.8, 2.6, 3.5, 4.3, or even higher. In other embodiments, the layered articles have such peel strength after boiling water exposure.

In another respect, the present invention relates to a method of bonding. The bonding may comprise providing a substrate, optionally selected from a substantially inorganic material, according to the substrates described above. The method further provides contacting the substrate with a fluoropolymer blend comprising a fluoropolymer, a bubble suppressing metal compound, a base, and a phase transfer catalyst.

The fluoropolymer blend may be applied via any known method. Such methods include, for example, coating as a liquid, applying as a powder, laminating, coextrusion, rotolining, and combinations thereof. Coating may further comprise spray coating, dip coating, flow coating, roll coating, or electrostatic powder coating. One such method, electrostatic powder coating, is described below.

In a further aspect, the method provides bonding the first layer to the substrate. Such bonding may include, for instance, fusing the first layer to the substrate such as via heat fusing. Such heat fusing may be used to bond the first layer and/or any optional additional layer(s).

The first layer may have a thickness below about 5 mm, 2 mm, more preferably below about 1 mm, or below about 0.5 mm.

The method of bonding may further comprise treating the substrate with a pre-treatment, such as by the commercially available pre-treatment PICKLEX 30 (available from International Chemical Products, Inc. of Huntsville, Ala.), prior to contacting the substrate with the first layer as described above. The pre-treatment treatment may comprise contacting a dilute solution of pre-treatment with the surface of the substrate. While one of ordinary skill in the art may select the appropriate level of pre-treatment, useful levels include less than 5 grams of pre-treatment in the dilute solution per square inch of substrate surface, less than 2 grams per square inch of substrate surface, or even less than 1 gram per square inch of substrate surface.

According to the method of the present invention, a second layer may be contacted to the first layer by the same processes used to contact the first layer to the substrate. The second layer may be bonded to the first layer by any appropriate method, including those discussed above with respect to bonding the first layer to the substrate. The second layer may be as described above with respect to layered articles. The contacting of the second layer may be the same or different than the contacting of the first layer to the substrate.

Various embodiments of the present invention are useful in various applications, including chemical storage tanks, exhaust duct coatings, biomedical devices, electronic materials, cookware and bakeware, and architectural coatings, to name a few.

Objects and advantages of this invention are further illustrated by the following examples, but the particular materials and amounts thereof recited in these examples are provided only by way of specific embodiments and should not be construed to unduly limit this invention.

EXAMPLES

In the descriptions below, percent means percent by weight unless otherwise described in context. Unless otherwise stated, materials were available from Aldrich Chemicals, Milwaukee, Wis.

| Materials | |
|---|---|
| TFE | Tetrafluoroethylene |
| HFP | Hexafluoropropylene |
| VDF | vinylidene fluoride |
| PPVE | Perfluoropropylvinylether |
| Fluoropolymer A | PFA 6503 A EPC, a copolymer of TFE and PPVE available from Dyneon, Oakdale, MN. |
| Fluoropolymer B | PFA 6503 B EPC, a postfluorinated copolymer of TFE and PPVE available from Dyneon, Oakdale, MN |
| Fluoropolymer C | FEP-X 6315A, a copolymer of TFE and HFP available from Dyneon, Oakdale, MN |
| Fluoropolymer D | THV500A available from Dyneon, Oakdale, MN |
| Fluoropolymer E | PFA 6613N available from Dyneon, Oakdale, MN |
| Fluoropolymer F | E-15858H05 available from Dyneon, Oakdale, MN |
| Fluoropolymer G | E-15231A02 partially postfluorinated 7 MFI FEP agglomerate available from Dyneon, Oakdale, MN |
| Fluoropolymer H | HTE 1705 available from Dyneon, Oakdale, MN |

Methods and Procedures

Formulations

Except as provided otherwise, dry and liquid ingredients shown for each example in the tables were weighed and added to the milling chamber of a Bel-Art Micro Mill (available from Bel-Art Products Pequannock, N.J.). The mill was turned on for 20-30 seconds to disperse the ingredients. Metal compounds and bases were either used as is with median particle size less than 5 microns or ground to less than 5 microns with a mortar and pestle.

PICKLEX Pretreatment

Aluminum panels were prepared as described under "Peel Test Sample Preparation". The aluminum strips were then treated with PICKLEX 30 (available from International Chemical Products, Inc. of Huntsville, Ala.). This was done by heating the PICKLEX 30 to 130° F. (55° C.) and dipping the clean peel strips into the PICKLEX 30 for 90 seconds. The strips were removed from the PICKLEX 30 and rinsed under running water for 45-60 seconds. The peel strips were immediately dried for 15 minutes at 300° F. (160° C.). Samples pre-treated in this manner are denoted "PICKLEX" in the tables (e.g., example 10).

Peel Test Sample Preparation

Stainless steel (400 series) or aluminum panels (0.037 in. thickness (0.94 mm)) were sheared into 1×6 inch (2.54×15.2 cm) strips and degreased by immersing the steel strips in a heated alkaline solution of 75 g of OAKITE CLEANER 164 (available from Oakite Products, Berkeley Heights, N.J.) per liter of water maintained at 180° F. (80° C.) for 10 minutes. The strips were then rinsed several times with distilled water, and dried in an air circulating oven at 160° F. (71° C.) for 10 minutes. Unless otherwise noted each strip was grit blasted to roughen the surface using 30 mesh alumina grit and 80 psi (552 kPa) air pressure. Any residual dust was removed with an air gun. The strips were clamped to a larger metal plate and brushed with a thin layer of PFA 6503 B EPC powder (available from Dyneon) over 1.5 to 2 inches (5 cm) of one end of each strip. This provided an area where the coating would not adhere to the metal to create a tab for the peel test.

The strips were next electrostatically powder coated with a primer using a Nordson SureCoat (Nordson Corporation Amherst, Ohio) at 70 volts, 150 kPa airflow until no bare metal was visible. The strips were then baked in an air-circulating oven for 10 minutes (unless indicated otherwise) and the temperature specified in the tables. Upon removal of the strips from the oven, the strips were immediately hot flocked with the specific virgin fluoropolymer topcoat at 70 kVolts, 150 kPa airflow and then placed back into the oven for an additional 10 minutes. Additional topcoats (total of 2 or 3) were applied and baked to achieve a coating thickness of 300 to 500 μm. After the samples were cooled, the edges of each strip were scraped with a sharp blade to remove any coating that may have accumulated at the edges of the specimen. The samples were immersed in boiling water for 1 h. After removal from the water, the samples were held at room temperature for at least 4 hours prior to peel testing unless otherwise noted.

Peel Testing

The peel strength was measured by testing the samples using an INSTRON Model 5564 Tester (available from Instron Corp., Canton, Mass.) equipped with a floating roller peel test fixture at a crosshead speed of 6 in/min (15 cm/min) and peeling to 3.75 inches (9.5 cm) extension per ASTM D3167-97. The peel strength was calculated over 0.5 to 3.5 inches (1.3 to 8.9 cm) extension using an integrated average and reported in lb/inch width (N/mm) as an average of three samples. All peel testing was performed on samples after they were exposed to 1 hour of boiling water.

Examples 1-20 and Comparative Examples C1-C3

The fluoropolymer blends were prepared with the amounts shown in Tables 1-4 by blending a metal compound, a base, and a specific fluoropolymer with a 50% solution of a phase transfer catalyst in methanol (weights in tables are for solids). Unless otherwise noted the procedure used is that described under "Formulations". The resulting fluoropolymer blend was then powder coated and peel tested using the procedures described under "Peel Test Sample Preparation" and "Peel Testing" (unless otherwise noted). The formulations and peel test results are shown in the Tables 1-4. Where the peel strength is indicated as "Less than 2 lb/in (<0.3 N/mm)", this indicates that the sample was bonded to the substrate both before and after boiling water exposure, but that the Peel Testing method was not able to quantify the strength of the bonding after boiling water exposure. NT indicates that a peel strength was not tested. Where the peel strength is indicated as "O", this indicates that no bond was observed after boiling water exposure. The comparative examples C1-C3 were prepared in a similar manner to the examples but without certain components, as indicated in Table 4.

Table 1 shows a number of embodiments of the described fluoropolymer blends and multi-layered articles using various metal compounds. Table 2 shows a number of embodiments of the described fluoropolymer blends and multi-layered articles using various fluoropolymers. Table 3 shows a number of embodiments of the described fluoropolymer blends and multi-layered articles using various bases. Table 4 shows a group of comparative examples C1-C3. As can be seen in Table 4, when certain components are excluded from the fluoropolymer blend (e.g., phase transfer catalyst, base, or combinations thereof), no bonding is observed to either stainless steel or aluminum after exposure to boiling water for one hour.

TABLE 1

Compositions with Various Metal Compounds

| Ex. | Fluoropolymer (g) | Metal Compound (g) | PTC (g) | Base (g) | °F. (°C.) | Peel Strength lb/in (N/mm) SS | Al |
|---|---|---|---|---|---|---|---|
| 1 | A (39.0) | Sn (0.4) | TPPCl (0.4) | Ca(OH)$_2$ (0.2) | 700 (370) | 10.5 (1.8) | Less than 2 (<0.3) |
| 2 | A (39.0) | SnO (0.4) | TPPCl (0.4) | Ca(OH)$_2$ (0.2) | 700 (370) | 11.3 (2.0) | Less than 2 (<0.3) |
| 3 | A (38.35) | Al (0.4) | TPPCl (1.0) | Ca(OH)$_2$ (0.25) | 725 (385) | Tabs broke @ 25 (4.4) | Less than 2 (<0.3) |
| 4 | A (39.0) | Sn(SO$_4$) (0.4) | TPPCl (0.4) | Ca(OH)$_2$ (0.2) | 700 (370) | 3.6 (0.6) | Less than 2 (<0.3) |
| 5 | A (39.0) | Zn (0.4) | TPPCl (0.4) | Ca(OH)$_2$ (0.2) | 700 (370) | 6.6 (1.2) | Less than 2 (<0.3) |
| 6 | A (39.0) | Bronze (0.4) | TPPCl (0.2) | Ca(OH)$_2$ (0.2) | 700 (370) | 0 | 2.8 (0.5) |
| 7 | A (38.35) | MgAl$_2$(SiO$_4$)$_2$ (0.4) | TPPCl (1.0) | Ca(OH)$_2$ (0.25) | 725 (385) | 20 (3.5) | Less than 2 (<0.3) |
| 8 | A (38.35) | Cr (0.4) | TPPCl (1.0) | Ca(OH)$_2$ (0.25) | 725 (385) | 23 (4.0) | Less than 2 (<0.3) |
| 9 | A (38.35) | Fe (0.4) | TPPCl (1.0) | Ca(OH)$_2$ (0.25) | 725 (385) | 22 (3.9) | Less than 2 (<0.3) |
| 10 | A (38.35) | Sn$_2$O (0.4) | TPPCl (1.0) | Ca(OH)$_2$ (0.25) | 725 (385) | 17 (3.0) | 5.0 (0.9) PICKLEX |

TABLE 2

Compositions with Various Fluoropolymers

| Ex. | Fluoropolymer (g) | Metal Compound (g) | PTC (g) | Base (g) | °F. (°C.) | Peel Strength lb/in (N/mm) SS | Al |
|---|---|---|---|---|---|---|---|
| 11 | A (39.2) | Sn (0.4) | TPPCl (0.1) | Ca(OH)$_2$ (0.2) | 700 (370) | 6.0 (1.1) | 5.0 (0.9) |
| 12 | C (38.35) | Sn (0.4) | TPPCl (1.0) | Ca(OH)$_2$ (0.25) | 700 (370) | 17 (3.0) | 23 (4.0) |
| 13 | D (38.35) | Sn (0.4) | TPPCl (1.0) | Ca(OH)$_2$ (0.25) | 500 (260) | Less than 2 (<0.3) | 3.0 (0.5) |
| 14 | E (39.4) | Sn (0.2) | TPPCl (0.1) | Ca(OH)$_2$ (0.2) | 700 (370) | 1.5 (0.3) | 5.9 (1.0) |
| 15 | F (38.35) | Sn (0.4) | TPPCl (1.0) | Ca(OH)$_2$ (0.25) | 550 (288) | Tabs broke @40 (7.0) | Less than 2 (<0.3) |
| 16 | G (38.35) | Sn (0.4) | TPPCl (1.0) | Ca(OH)$_2$ (0.25) | 680 (360) | 12 (2.1) | 20 (3.5) |

TABLE 3

Compositions with Various Bases

| Ex. | Fluoropolymer (g) | Metal Compound (g) | PTC (g) | Base (g) | °F. (°C.) | Peel Strength lb/in (N/mm) SS | Al |
|---|---|---|---|---|---|---|---|
| 17 | A (38.35) | Sn (0.4) | TPPCl (1.0) | CH$_3$ONa (0.25) | 750 (400) | 3.5 (0.6) | NT |
| 18 | A (38.35) | Sn (0.4) | TPPCl (1.0) | CaO (0.25) | 750 (400) | 3.0 (0.5) | Less than 2 (<0.3) |

TABLE 3-continued

Compositions with Various Bases

| Ex. | Fluoropolymer (g) | Metal Compound (g) | PTC (g) | Base (g) | °F. (°C.) | Peel Strength lb/in (N/mm) SS | Al |
|---|---|---|---|---|---|---|---|
| 19 | A (36.60) | Sn (0.4) | TPPCl (1.5) | KOH (2.0) | 750 (400) | Less than 2 (<0.3) | 6.5 (1.1) |
| 20 | B (38.10) | Sn (0.4) | TPPCl (1.5) | LiOH•H$_2$O (0.50) | 750 (400) | 4.0 (0.7) | Less than 2 (<0.3) |

TABLE 4

Comparative Compositions

| Ex. | Fluoropolymer (g) | Metal Compound (g) | PTC (g) | Base (g) | °F. (°C.) | Peel Strength lb/in (N/mm) SS | Al |
|---|---|---|---|---|---|---|---|
| C1 | A (38.60) | Sn (0.4) | TPPCl (0.1) | None | 750 (400) | 0 | 0 |
| C2 | A (39.20) | Sn (0.6) | None | Ca(OH)$_2$ (0.20) | 700 (370) | 0 | 0 |
| C3 | A (39.60) | Sn (0.4) | None | None | 750 (400) | 0 | 0 |

Examples 21-22

These examples used a slightly different blending procedure and peel test sample preparation then that used for the other examples. The materials were combined in a bottle and mixed for 1 hour on a US Stoneware Jar Mill Model 784AVM (East Palestine, Oreg.). The mixture was coated on 304 stainless steel rather than 400 series. The stainless steel substrate was prepared by rinsing with isopropanol rather than the alkaline cleaning of the other examples. In addition these samples were not grit blasted prior to coating. Rather than being electrostatically coated as in the other examples these samples were prepared by sprinkling the blended formulations by hand onto the metal coupons and then heating on a WABASH Model 01-5H-12-OX Platen Press at 595° F. (313° C.) The coupon samples were heated for 2.5 min on the open press to melt the primer and then the press was closed down with minimal pressure (less than 5 Paar) and heating continued for another 2.5 min. The samples were then quenched on a WABASH press cold plate to room temperature. Peel tests were conducted as indicated in the other examples except that the tests were done after the samples were boiled in water for 5 hours rather than 1 hr.

For example 21, 22.5 g of Fluoropolymer H was mixed with 0.5 g TPPCI, 1.0 g Ca(OH)$_2$ and 1.0 g MgO. For example 22, 20 g of Fluoropolymer H was mixed with 1.0 g TPPCI, 2.0 g Ca(OH)$_2$ and 2.0 g MgO. In both examples, the peel test results were greater than 25 lb/in (>4.3 N/mm). In both examples, top-coats of virgin Fluoropolymer H were subsequently added onto the first layer by the same procedure as the first layer was added onto the substrate.

What is claimed is:

1. A fluoropolymer blend comprising a fluoropolymer having a major amount of fluorothermoplastic, a bubble suppressing metal compound, a base and a phase transfer catalyst, wherein the bubble suppressing metal compound is a metal powder having a particle size no greater than 10 µm.

2. The fluoropolymer blend of claim 1 wherein the fluorothermoplastic is a copolymer derived from copolymerizable units comprising a perfluorinated alkyl olefin of the formula CF$_2$=CFR wherein R is F or a linear, branched, or cyclic perfluorinated alkyl group of 1 to 10 carbon atoms; a perfluoro(alkyl vinyl) ether; a perfluoro(alkoxy vinyl) ether; or combinations thereof.

3. The fluoropolymer blend of claim 1 wherein the fluorothermoplastic is a homo- or copolymer derived from polymerizable units of a perfluorinated alkyl olefin of the formula CF$_2$=CFR wherein R is F or a linear, branched, or cyclic perfluorinated alkyl group of 1 to 10 carbon atoms.

4. The fluoropolymer blend of claim 1 wherein the fluorothermoplastic is a copolymer derived from copolymerizable units selected from vinylidene fluoride, hexafluoropropylene, perfluorovinyl ethers, ethylene, propylene, chlorotrifluoroethylene, or combinations thereof.

5. The fluoropolymer blend of claim 1 wherein the fluorothermoplastic is a copolymer derived from copolymerizable units of tetrafluoroethylene and hexafluoropropylene; tetrafluoroethylene and perfluoro(propyl vinyl) ether; tetrafluoroethylene and perfluoro(methyl vinyl) ether; tetrafluoroethylene and perfluoro(ethyl vinyl) ether; tetrafluoroethylene and ethylene; tetrafluoroethylene and propylene; tetrafluoroethylene, hexafluoropropylene and vinylidene fluoride; ethylene and chlorotrifluoroethylene; or combinations thereof.

6. The fluoropolymer blend of claim 1 wherein the fluorothermoplastic has 50 or more reactive endgroups per 10$^6$ carbon atoms.

7. The fluoropolymer blend of claim 1 wherein the fluorothermoplastic has fewer than 50 reactive endgroups per 10$^6$ carbon atoms.

8. The fluoropolymer blend of claim 1 wherein the bubble suppressing metal compound is Sn, SnO, Active Al, $SnSO_4$, Fe, Zn, $MgAl_2(SO_4)_2$, Cr, or combinations thereof.

9. The fluoropolymer blend of claim 1 wherein the bubble suppressing metal compound is present in an amount less than 5% by weight based on the total weight of the fluoropolymer, metal compound, base, and phase transfer agent.

10. The fluoropolymer blend of claim 1 wherein the base is a Group 1 hydroxide, a Group 2 hydroxide, an alkoxide salt, or combinations thereof.

11. The fluoropolymer blend of claim 1 wherein the phase transfer catalyst is a salt of triphenylbenzylphosphonium, tetraphenylphosphonium, tributylalkylphosphonium, tetrabutylphosphonium, tributylbenzylammonium, tetrabutylammonium, triarylsulfonium, fluorinated analogues or combinations thereof.

12. The fluoropolymer blend of claim 1 having a bubble index that is 50% lower than the bubble index of a comparative fluoropolymer blend, wherein the comparative fluoropolymer blend is identical to the fluoropolymer blend of claim 1 except that it is substantially free of bubble suppressing metal compound.

* * * * *

UNITED STATES PATENT AND TRADEMARK OFFICE
CERTIFICATE OF CORRECTION

PATENT NO. : 7,589,140 B2
APPLICATION NO. : 11/239585
DATED : September 15, 2009
INVENTOR(S) : Blake E. Chandler et al.

It is certified that error appears in the above-identified patent and that said Letters Patent is hereby corrected as shown below:

Column 3
Line 48, delete "exothernicity" and insert in place thereof -- exothermicity --.

Column 4
Line 50, delete "camauba" and insert in place thereof -- carnauba --.

Column 6
Line 6, delete "notacontain" and insert in place thereof -- not contain --.

Column 10
Line 58 (approx.), delete ""O","  and insert in place thereof -- "0", --.

Column 13
Line 56, delete "TPPCI," and insert in place thereof -- TPPCl --.

Line 57, delete "TPPCI," and insert in place thereof -- TPPCl --.

Signed and Sealed this

Twenty-second Day of December, 2009

David J. Kappos
*Director of the United States Patent and Trademark Office*